(12) United States Patent
Hamada et al.

(10) Patent No.: US 10,972,271 B2
(45) Date of Patent: Apr. 6, 2021

(54) SECRET AUTHENTICATION CODE ADDING DEVICE, SECRET AUTHENTICATION CODE ADDING METHOD, AND PROGRAM

(71) Applicant: NIPPON TELEGRAPH AND TELEPHONE CORPORATION, Chiyoda-ku (JP)

(72) Inventors: Koki Hamada, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 313 days.

(21) Appl. No.: 15/761,679

(22) PCT Filed: Oct. 11, 2016

(86) PCT No.: PCT/JP2016/080049
§ 371 (c)(1),
(2) Date: Mar. 20, 2018

(87) PCT Pub. No.: WO2017/065122
PCT Pub. Date: Apr. 20, 2017

(65) Prior Publication Data
US 2018/0351745 A1 Dec. 6, 2018

(30) Foreign Application Priority Data
Oct. 13, 2015 (JP) .............................. JP2015-202057

(51) Int. Cl.
*H04L 9/32* (2006.01)
*G09C 1/00* (2006.01)
(Continued)

(52) U.S. Cl.
CPC .................. *H04L 9/32* (2013.01); *G09C 1/00* (2013.01); *H04L 9/0861* (2013.01); *H04L 9/14* (2013.01); *H04L 9/085* (2013.01); *H04L 2209/46* (2013.01)

(58) Field of Classification Search
CPC ......... H04L 9/085; H04L 9/0861; H04L 9/14; H04L 9/302; H04L 9/32; G09C 1/00
See application file for complete search history.

(56) References Cited

U.S. PATENT DOCUMENTS 9,860,058 B2 * 1/2018 Ikarashi .................. G06F 21/71
2002/0164033 A1 * 11/2002 Rajasekaran ........... H04L 9/085
380/278
(Continued)

OTHER PUBLICATIONS

R.R. Jueneman • S.M. Matyas • C.H. Meyer; Message Authentication with Manipulation Detection Code; 1983 IEEE Symposium on Security and Privacy (p. 33); (Year: 1983).*
(Continued)

*Primary Examiner* — Luu T Pham
*Assistant Examiner* — Chao Wang
(74) *Attorney, Agent, or Firm* — Oblon, McClelland, Maier & Neustadt, L.L.P.

(57) ABSTRACT

A secure text having an authentication code is efficiently created. A key generation part 12 generates secure texts ([x], [α], [β]) of "x", "α" and "β" that are values satisfying $x\alpha=\beta$. A secure text generation part 13 generates secure texts [$a_i$] of random values "$a_i$" for i=1, . . . , N. An authentication code generation part 14 generates authentication codes [γ($a_i$)] by multiplying the secure texts [$a_i$] by the secure text [α] for i=1, . . . , N. A verification value generation part 15 generates a secure text [w] of a verification value "w" using the secure texts ([x], [α], [β]), the secure text [$a_i$] and the authentication code [γ($a_i$)]. A verification value determina-
(Continued)

tion part 16 determines whether the verification value "w" is equal to zero or not.

5 Claims, 5 Drawing Sheets

(51) Int. Cl.
   *H04L 9/08* (2006.01)
   *H04L 9/14* (2006.01)

(56) References Cited

U.S. PATENT DOCUMENTS

2013/0339728 A1* 12/2013 Ikarashi ............... H04L 9/3218
                                                            713/164
2018/0139045 A1*  5/2018 Furukawa ............... H04L 63/06

OTHER PUBLICATIONS

L.R. Knudsen • B. Preneel; MacDES: MAC algorithm based on DES; Electronics Letters (vol. 34, Issue: 9, pp. 871-873); (Year: 2007).*

M. Baugher • D. McGrew • M. Naslund • E. Carrara • K. Norrman; The Secure Real-time Transport Protocol; Internet Society Requests for Comments; (Year: 2004).*

Extended European Search Report dated Mar. 7, 2019 in European Patent Application No. 16855376.6, 9 pages.

International Search Report dated Nov. 8, 2016 in PCT/JP2016/080049 filed Oct. 11, 2016.

Hamada, K. et al., "Commodity-Based Secure Multi-party Computation", Computer Security Symposium 2015, Oct. 21-23, 2015, pp. 995-1002.

Chida, K. et al., "A Three-Party Secure Function Evaluation with Lightweight Verifiability Revisited", Computer Security Symposium, 2010, 6 total pages.

Damgård, I. et al., "Practical Covertly Secure MPC for Dishonest Majority—or: Breaking the SPDZ Limits", Computer Security—ESORICS 2013, vol. 8134 of Lecture Notes in Computer Science, 2013, 44 pages.

* cited by examiner

SECRET AUTHENTICATION CODE ADDING DEVICE, SECRET AUTHENTICATION CODE ADDING METHOD, AND PROGRAM

TECHNICAL FIELD

The present invention relates to an applied cryptography technique and, in particular, to a technique of adding an authentication code without disclosing input data.

BACKGROUND ART

Methods of obtaining specific operation results without decrypting encrypted numerical values include a method called secret calculation (e.g., Non-patent literature 1). The method of Non-patent literature 1 performs encryption that allows three secret calculation devices to share the fragments of the numerical value, and the three secret calculation devices perform cooperative operation, which can allow the three secret calculation devices to hold the results of addition and subtraction, constant addition, multiplication, constant multiplication, logical operation (negation, logical conjunction, logical disjunction, and exclusive OR), and data format conversion (integer, and binary numeral) without decrypting the numerical value, in a state of being shared among these devices, i.e., being left encrypted.

Methods of providing resistance to falsification by adding an authentication code when secret calculation is performed include a method in Non-patent literature 2.

PRIOR ART LITERATURE

Non-Patent Literature

Non-patent literature 1: Koji Chida, Koki Hamada, Dai Ikarashi, and Katsumi Takahashi, "A Three-Party Secure Function Evaluation with Lightweight Verifiability Revisited", CSS, 2010.

Non-patent literature 2: Ivan Damgard, Marcel Keller, Enrique Larraia, Valerio Pastro, Peter Scholl, and Nigel P. Smart, "Practical covertly secure MPC for dishonest majority—or: Breaking the SPDZ limits", Computer Security—ESORICS 2013, vol. 8134 of Lecture Notes in Computer Science, pp. 1-18, 2013.

SUMMARY OF THE INVENTION

Problems to be Solved by the Invention

Unfortunately, the conventional art described in Non-patent literature 2 uses somewhat homomorphic encryption that has significantly high calculation cost, for the sake of creating a secure text having a random authentication code. Consequently, the efficiency is low.

In view of such a point, the present invention has an object to provide a technique for efficiently creating a secure text having a random authentication code.

Means to Solve the Problems

To achieve the above object, a secret authentication code adding device according to the present invention, comprises: a key generation part that generates secure texts ($[x]$, $[\alpha]$, $[\beta]$) of "x", "$\alpha$" and "$\beta$" that are values satisfying $x\alpha=\beta$; a secure text generation part that generates secure texts $[a_i]$ of random values "$a_i$" for $i=1, \ldots, N$, where N is an integer of one or more; an authentication code generation part that generates authentication codes $[\gamma(a_i)]$ by multiplying the secure texts $[a_i]$ by the secure text $[\alpha]$ for $i=1, \ldots, N$; a verification value generation part that generates the secure text $[w]$ of a verification value "w" by calculating a following formula; and $$\mathrm{Mul}((\Sigma_i[a_i])+[x],[\alpha])-((\Sigma_i[\gamma(a_i)])+[\beta])$$

a verification value determination part that determines whether the verification value "w" is equal to zero or not.

Effects of the Invention

The secret authentication code adding technique according to the present invention can efficiently create a secure text having a random authentication code.

DETAILED DESCRIPTION OF THE EMBODIMENTS

Prior to the description of embodiments, the representation method and definition of terms in this Description are described.

<Representation Method>

A value secreted by applying encryption or secret sharing to a certain value "a" is called a secure text of the "a" and is represented as $[a]$. The "a" is called the plain text of $[a]$. In a case where the secreting is secret sharing, a set of the secret sharing fragments held by each party is referred to $[a]$. A share held by an i-th party $P_i$ in the secure text $[a]$ is referred to using $[a]_i$. The share is a fragment obtained by secret sharing. The party is each participant who cooperatively performs secret calculation.

<Decryption>

A process of calculation the plain text "a" from the secure text $[a]$ is called decryption, and is described as in the following formula.

$$a \leftarrow \mathrm{Reveal}([a])$$

<Addition, Subtraction, Multiplication, and Constant Multiplication>

Addition, subtraction and multiplication that are each applied to the secure text adopt secure texts $[a]$ and $[b]$ of two values "a" and "b" as inputs, and calculate the secure texts $[d_1]$, $[d_2]$ and $[d_3]$ of the calculation results "$d_1$", "$d_2$" and "$d_3$" of "a+b", "a−b" and "ab". The constant multiplication operation to the secure text adopts the secure text $[a]$ of the value "a", and the plain text "c" as inputs, and calculates the secure text $[d_4]$ of the calculation result "$d_4$"

of "ca". Execution of such operation is described as in the following formula.

$$[d_1] \leftarrow \text{Add}([a],[b]),$$

$$[d_2] \leftarrow \text{Sub}([a],[b]),$$

$$[d_3] \leftarrow \text{Mul}([a],[b]),$$

$$[d_4] \leftarrow \text{CMul}(c,[a])$$

Note that in a case without any fear of causing misunderstanding, Add([a], [b]), Sub([a], [b]), Mul([a], [b]), and CMul(c, [a]) are abbreviated as [a]+[b], [a]−[b], [a][b], and c[a], respectively.

<Generation of Random Secure Text>

A process of generating a secure text [r] of a random value "r" unknown to anybody is described as in the following formula.

$$[r] \leftarrow \text{Rand}(\ )$$

<Commitment>

The commitment comprises two processes, which are committing and opening processes. The committing is a process of allowing a certain party serving as a transmitter to submit secretly a certain value to another party. The opening is a process of disclosing the committed value to all the parties. The parties other than the transmitter cannot know the committed value until the value is opened. The value committed by the transmitter cannot be falsified by any of the parties including the transmitter.

A process by a certain party $P_i$ to commit a certain value "v" is described as in the following formula.

$$\tau_v \leftarrow \text{Commit}(v)$$

$\tau_v$ is a tag associated with the committed value "v", and is transmitted to all the parties.

A process by the party $P_i$ to open the committed value "v" associated with the tag $\tau_v$ is described as in the following formula.

$$v \leftarrow \text{Open}(\tau_v)$$

This process allows all the parties to obtain the committed value "v" associated with the tag $\tau_v$.

Embodiments of the present invention are hereinafter described in detail. In the diagrams, configuration parts having the same functions are assigned the same numerals, and redundant description is omitted.

First Embodiment

Figure 1:
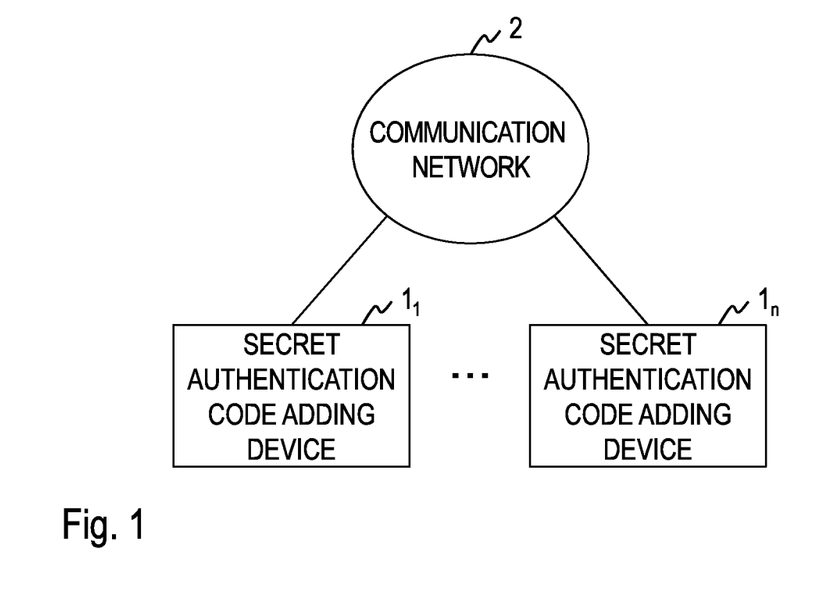
FIG. 1 is a diagram exemplifying a functional configuration of a secret authentication code adding system.

A secret authentication code adding system of a first embodiment comprises n (≥2) secret authentication code adding devices $1_1, \ldots, 1_n$, as exemplified in FIG. 1. In this embodiment, the secret authentication code adding devices $1_1, \ldots, 1_n$ are connected to a communication network 2. The communication network 2 is a communication network that is of a circuit switching scheme or a packet switching scheme and is configured to be capable of communicating with each of the secret authentication code adding devices $1_1, \ldots, 1_n$. For example, the Internet, LAN (Local Area Network), WAN (Wide Area Network) or the like may be used. Each device is not necessarily capable of communicating online via the communication network 2. For example, it may be configured such that information to be input into the secret authentication code adding devices $1_i$ (i∈{1, . . . , n}) is stored in a portable recording medium, such as magnetic tape or a USB memory, and input is made offline from the portable recording medium.

Figure 2:
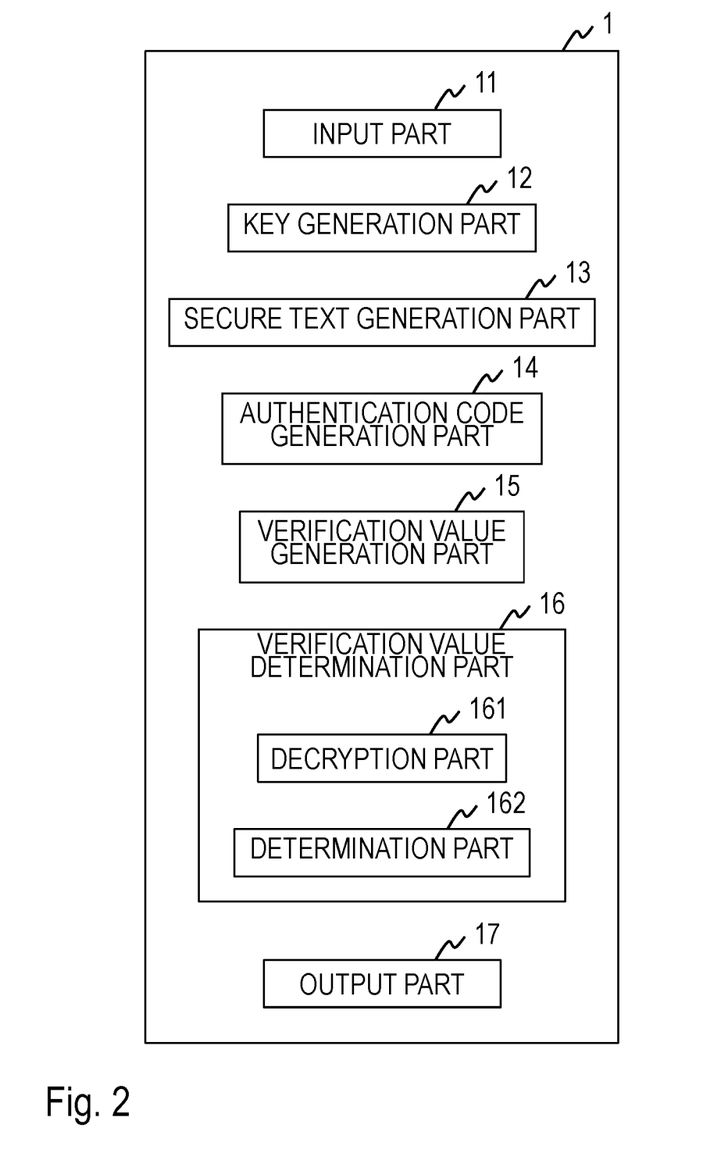
FIG. 2 is a diagram exemplifying a functional configuration of a secret authentication code adding device according to a first embodiment.

As shown in FIG. 2, the secret authentication code adding device 1 comprises, for example, an input part 11, a key generation part 12, a secure text generation part 13, an authentication code generation part 14, a verification value generation part 15, a verification value determination part 16, and an output part 17. The verification value determination part 16 comprises, for example, a decryption part 161, and a determination part 162. The secret authentication code adding device 1 performs the process of each step exemplified in FIG. 3, thereby achieving a secret authentication code adding method according to the first embodiment.

The secret authentication code adding device 1 is a specific device configured to comprise a publicly known or dedicated computer which comprises a central processing unit (CPU) and a main memory (RAM: Random Access Memory) and in which a special program is installed. The secret authentication code adding device 1 executes each process under control by the central processing unit, for example. Data items input into the secret authentication code adding device 1 and data items obtained by each process are stored in the main memory, for example. The data items stored in the main memory are read by the central processing unit as required, and are used for another process. At least a part or some of the processing parts of the secret authentication code adding device 1 may comprise hardware, such as an integrated circuit.

Figure 3:
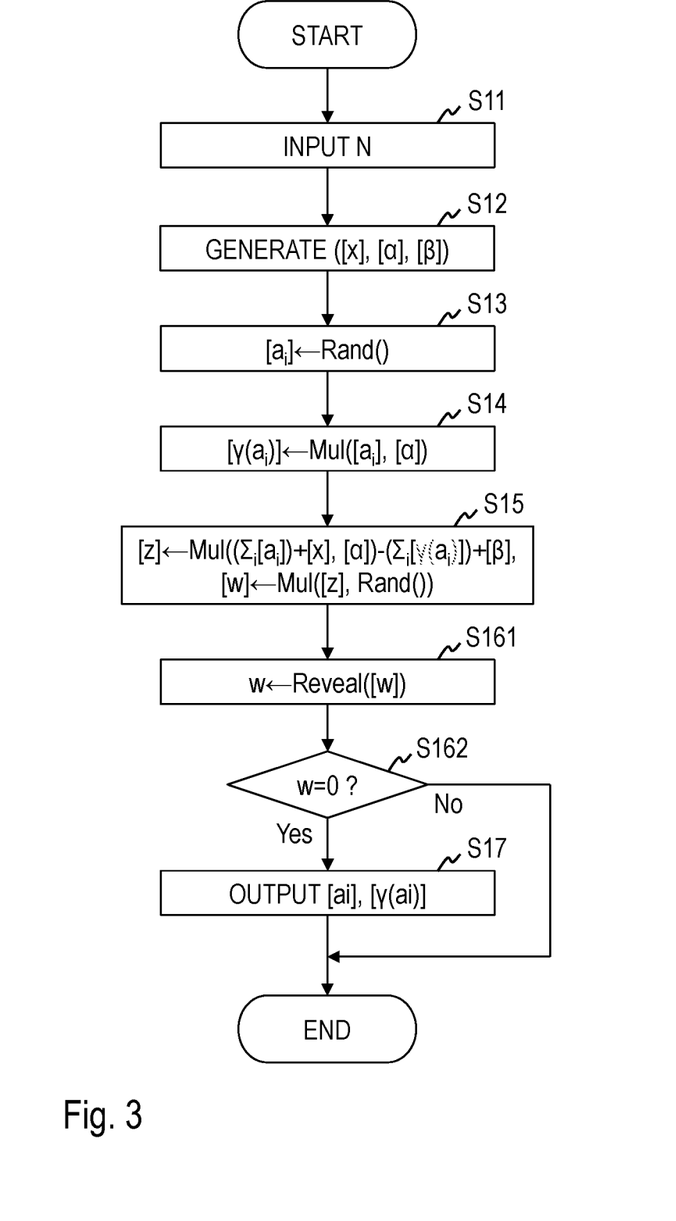
FIG. 3 is a diagram exemplifying a processing flow of a secret authentication code adding method according to the first embodiment.

Referring to FIG. 3, the processing procedures of the secret authentication code adding method according to the first embodiment are described.

In step S11, a value "N" is input into the input part 11. "N" is an integer of one or more, and is a parameter that designates the number of secure texts that have authentication codes and are to be generated.

In step S12, the key generation part 12 generates authentication code keys ([x], [α], [β]) that are the secure texts of values "x", "α" and "β", which satisfy xα=β. A method of generating a combination of the secure texts that satisfy such a relationship is described in Non-patent literature 2, for example. Alternatively, the secure texts [x] and [α] of random values "x" and "α" may be generated, and the combination of ([x], [α], [β]) may be generated by calculating [β]←Mul([x], [α]) according to the secret calculation method described in Non-patent literature 1, for example. The authentication code keys ([x], [α], [β]) are transferred to the authentication code generation part 14.

In step S13, the secure text generation part 13 calculates Formula (1) for i=1, . . . , N, and generates the secure texts $[a_i]$ having random values "$a_i$". The N secure texts $[a_1], \ldots, [a_N]$ are transferred to the authentication code generation part 14.

$$[a_i] \leftarrow \text{Rand}(\ )\Lambda \tag{1}$$

In step S14, the authentication code generation part 14 calculates Formula (2) for i=1, . . . , N, and generates authentication codes [γ($a_i$)] each obtained by multiplying the secure text [$a_i$] by the secure text [α]. The N authentication codes [γ($a_1$)], . . . , [γ($a_N$)] are transferred to the verification value generation part 15.

$$[\gamma(a_i)] \leftarrow \text{Mul}([a_i],[\alpha])\Lambda \tag{2}$$

In step S15, the verification value generation part 15 calculates Formulae (3) and (4) using the secure texts $[a_1], \ldots, [a_N]$, authentication codes [γ($a_1$)], . . . , [γ($a_N$)], and authentication code keys [α] and [β], and generates the secure text [w] of the verification value "w". The secure text [w] is transferred to the verification value determination part

16. The secure texts $[a_1], \ldots, [a_N]$, and authentication codes $[\gamma(a_1)], \ldots, [\gamma(a_N)]$ are output to the output part 17.

$$[z] \leftarrow \text{Mul}((\Sigma_i[a_i])+[x],[\alpha])-((\Sigma_i[\gamma(a_i)])+[\beta]),\Lambda \quad (3)$$

$$[w] \leftarrow \text{Mul}([z],\text{Rand}(\,))\Lambda \quad (4)$$

In steps S161 to 162, the verification value determination part 16 determines whether the verification value "w" is equal to zero or not. Hereinafter, more specifically, the processes by the verification value determination part 16 are described.

In step S161, the decryption part 161 receives the share of the secure text [w] from the other (n−1) secret authentication code adding devices, calculates Formula (5) to decrypt the secure text [w], and generates the verification value "w".

$$w \leftarrow \text{Reveal}([w])\Lambda \quad (5)$$

In step 162, the determination part 162 determines whether the verification value "w" is equal to zero or not. If the verification value "w" is not zero, the processing is finished. If the verification value "w" is zero, the processing proceeds to step S17.

In step S17, the output part 17 outputs N secure texts $([a_1], [\gamma(a_1)]), \ldots, ([a_N], [\gamma(a_N)])$ having authentication codes.

In this embodiment, the verification value generation part 15 thus generates the secure text [w] as the verification value obtained by multiplication of the secure text having the random value in Formula (4). Alternatively, the secure text [z] obtained by Formula (3) may be generated as the verification value. Note that, in a case where the secure text [z] is adopted as the verification value and where the secure text [z] has a value other than zero, this value sometimes allows the secure text $[a_i]$ and the authentication code keys ([x], [α], [β]) to be estimated. Consequently, in this embodiment, multiplication of the secure text having the random value in Formula (4) further improves the security.

Second Embodiment

A secret authentication code adding method according to a second embodiment authenticates the authentication code using commitment. This verification can prevent the verification value from being falsified, and more securely confirm the validity of the authentication code. This embodiment assumes that each secure text is secreted by n-party secret sharing. Such secret sharing encompasses, for example, a threshold secret sharing described in Non-patent literature 1, and additive secret sharing described in Non-patent literature 2.

Figure 4:
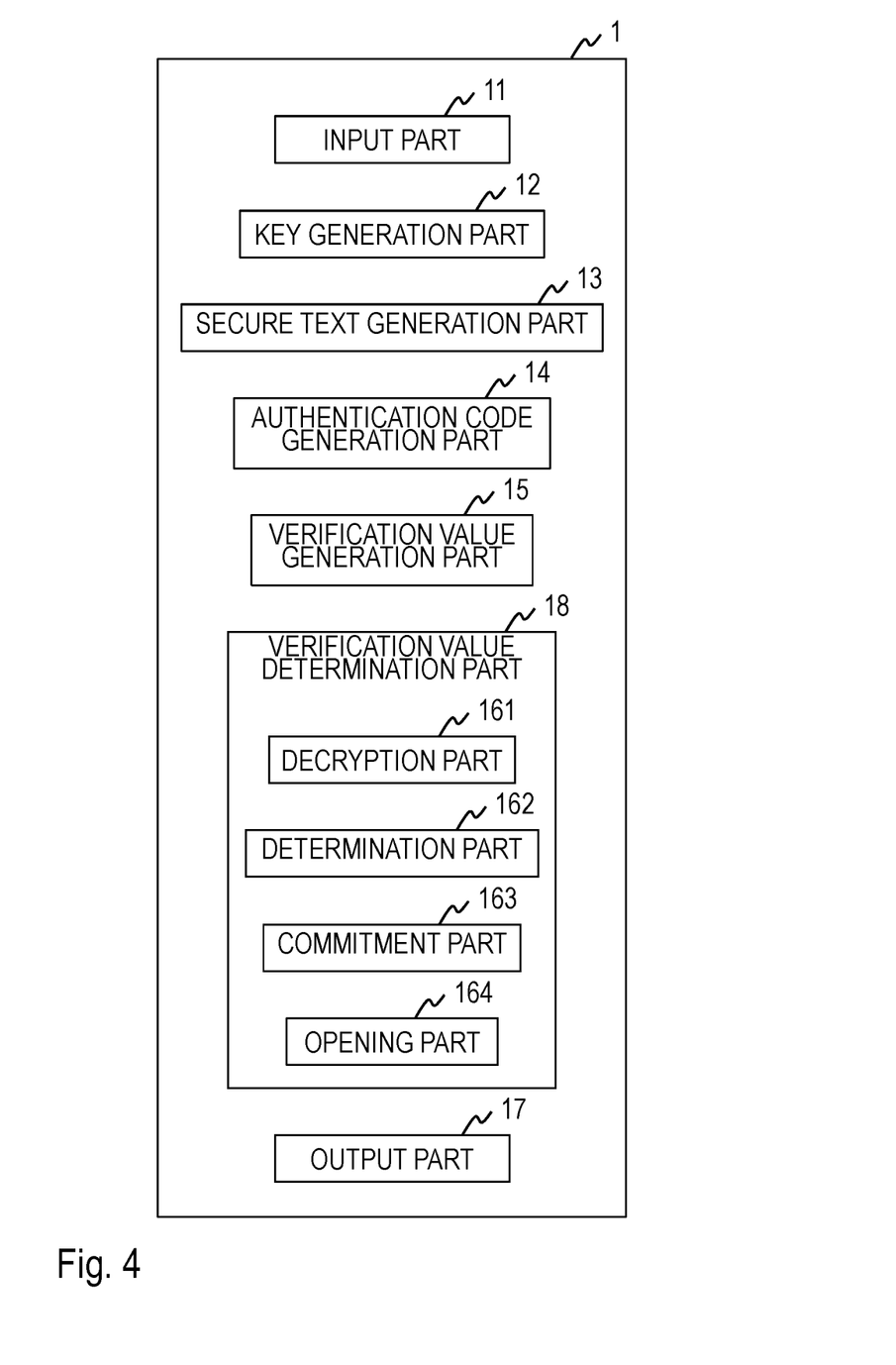
FIG. 4 is a diagram exemplifying a functional configuration of a secret authentication code adding device according to a second embodiment.

As shown in FIG. 4, the verification value determination part 18 according to the second embodiment comprises not only the decryption part 161 and the determination part 162 but also a commitment part 163 and an opening part 164, for example. The secret authentication code adding device, which comprises the verification value determination part 18, performs the process of each step exemplified in FIG. 5, thereby achieving a secret authentication code adding method according to the second embodiment.

Figure 5:
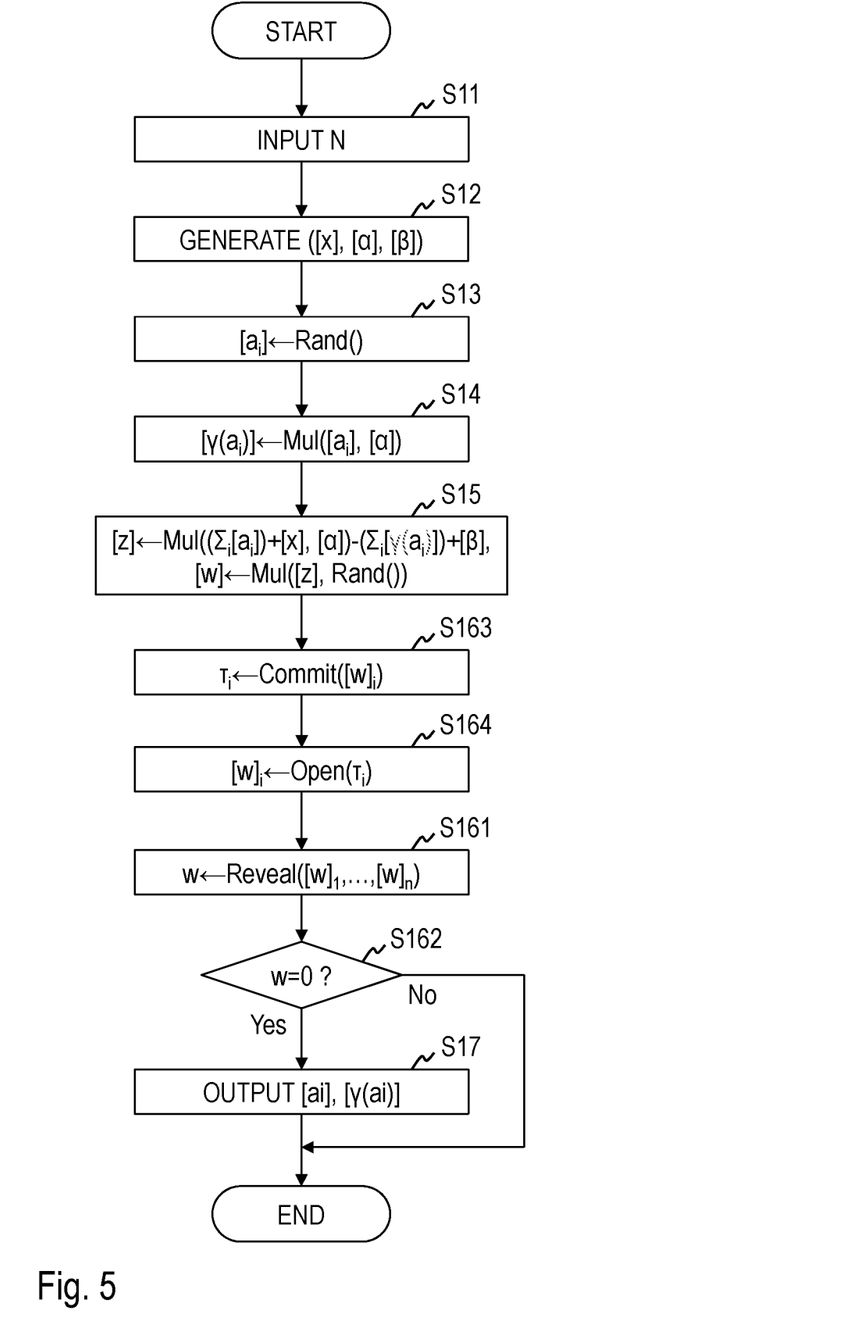
FIG. 5 is a diagram exemplifying a processing flow of a secret authentication code adding method according to the second embodiment.

Referring to FIG. 5, the processing procedures of the secret authentication code adding method according to the second embodiment are described. Hereinafter, differences from the first embodiment described above are mainly described. Hereinafter, the processes by i $(\in\{1, \ldots, n\})$-th secret authentication code adding device $1_i$ are mainly described.

In step S163, the commitment part 163 of the secret authentication code adding device $1_i$ calculates Formula (6), commits the share $[w]_i$ held by this device in the secure text [w] of the verification value w, and generates the tag $\tau_i$. Accordingly, the tag $\tau_i$ is transferred to each of the other (n−1) secret authentication code adding devices $1_j$ (j=1, ..., n, j≠i).

$$\tau_i \leftarrow \text{Commit}([w]_i)\Lambda \quad (6)$$

At the same time, each of the other secret authentication code adding devices $1_j$ (j=1, ..., n, j≠i) commits the share $[w]_j$ of the verification value [w], and generates the tag $\tau_j$. Accordingly, all the secret authentication code adding devices $1_1, \ldots, 1_n$ hold not only the tag committed by themselves but also the tags $\tau_1, \ldots, \tau_n$ associated with the respective shares $[w]_1, \ldots, [w]_n$ of the verification value [w].

In step S164, the opening part 164 of the secret authentication code adding device $1_i$ calculates Formula (7), and opens the tag $\tau_i$. Accordingly, all the other (n−1) secret authentication code adding devices $1_j$ (j=1, ..., n, j≠i) obtain the shares $[w]_i$ of the verification values [w].

$$[w]_i \leftarrow \text{Open}(\tau_i)\Lambda \quad (7)$$

At the same time, the other secret authentication code adding devices $1_j$ (j=1, ..., n, j≠i) each opens the tag $\tau_j$. Consequently, all the secret authentication code adding devices $1_1, \ldots, 1_n$ can each obtain not only the share held by themselves but also all the shares $[w]_i, \ldots, [w]_n$ of the verification value[w].

In step S161, the decryption part 161 of the secret authentication code adding device calculates Formula (8) to decrypt the share $[w]_i, \ldots, [w]_n$, and generates the verification value "w".

$$w \leftarrow \text{Reveal}([w]_1,\Lambda,[w]_n)\Lambda \quad (8)$$

In step 162, the determination part 162 of the secret authentication code adding device determines whether the verification value "w" is equal to zero or not. If the verification value "w" is not zero, the processing is finished. If the verification value "w" is zero, the processing proceeds to step S17.

In the second embodiment, the share is transmitted and received using the commitment when the verification value is determined. Consequently, the share of the verification value can be prevented from being leaked and falsified, thereby allowing the security to be improved.

According to the configuration described above, the secret authentication code adding technique of the present invention can generate the authentication code keys ([x], [α], [β]) and the N secure texts $([a_i], [\gamma(a_i)])$ having the authentication codes. Use of the generated secure text having the authentication code can generate the triplet of random numbers to which the authentication code required for multiparty calculation described in Non-patent literature 2 is added, for example.

In the present invention, the authentication code is added to the random secure text, using the multiplication having possibility of being falsified. Many of multiplication schemes that do not assume falsification have a possibility of falsification of adding any value to the input of multiplication. The secret authentication code adding technique of the present invention has resistance to falsification of adding any value to the plain text of each input in the multiplication. Accordingly, application of the present invention to a multiparty calculation scheme using multiplication that does not assume many types of falsification can add resistance to falsification.

The present invention is not limited to the embodiments described above. It is a matter of course that modification can be appropriately made in a scope without departing from the spirit of the present invention. The various types of processes described in the aforementioned embodiments can be executed in a time-series manner according to the order of description. Alternatively, such execution may be made in parallel or individually according to the processing capability of the device that executes the processes, as required.

[Program and Recording Medium]

In cases where the various processing functions in each device described in the above embodiments are implemented by a computer, the processing details of the functions to be included in each device are described as a program. The program is executed by the computer, thereby achieving the various processing functions in each device described above on the computer.

The program that describes the processing details can be recorded in a computer-readable recording medium. The computer-readable recording medium may be, for example, any recording medium, such as a magnetic recording device, an optical disk, a magneto-optical recording medium, or a semiconductor memory.

The program is distributed by, for example, selling, transferring, or lending a portable recording medium, such as DVD or CD-ROM, where the program is recorded. Alternatively, the program may be stored in a storing device of a server computer, and the program may be transferred from the server computer to another computer via a network, thereby distributing the program.

For example, the computer for executing such a program, first, stores the program recorded in the portable recording medium or transferred from the server computer, temporarily in its storing device. In execution of the process, the computer reads the program recorded in its recording medium, and executes the process according to the read program. According to another execution mode of this program, the computer may directly read the program from the portable recording medium, and execute the process according to the program. Further alternatively, every time the program is transferred to this computer from the server computer, the computer may successively execute the process according to the received program. Another configuration may be adopted that executes the process described above through a service of what is called an ASP (Application Service Provider) according to which the program is not transferred to this computer from the server computer, and the processing function is achieved only by an execution instruction therefor and acquisition of the result. The program according to this embodiment encompasses information that is provided for the process by the computer and conforms to the program (data and the like that are not direct instructions to the computer but have characteristics that define the process of the computer).

In this mode, this device is configured by executing a predetermined program on the computer. Alternatively, at least some of these processing details may be achieved as hardware.

What is claimed is:

1. A secure computation system comprising:
a plurality of secret authentication adding devices for generating and verifying a plurality of secure texts of authentication codes of random values while concealing the random values by secure computation, each secret authentication code adding device comprising circuitry configured to:
generate secure texts ($[x]$, $[\alpha]$, $[\beta]$) of "x", "$\alpha$" and "$\beta$" that are values satisfying $x\alpha=\beta$;
generate secure texts $[a_i]$ of random values "$a_i$" for i=1, ..., N, where N is an integer of one or more;
generate authentication codes $[\gamma(a_i)]$ by multiplying the secure texts $[a_i]$ by the secure text $[\alpha]$ for i=1, ..., N;
generate the secure text $[w]$ of a verification value "w" by calculating a following formula;

$\mathrm{Mul}((\Sigma_i[a_i])+[x],[\alpha])-((\Sigma_i[\gamma(a_i)])+[\beta])$;

generate a tag $\tau_i$ to commit a share $[w]_i$ of the secure text $[w]$ stored in the respective secret authentication code adding device, and transfer the tag $\tau_i$ to each of the other of the plurality of secret authentication code adding devices, while receiving a tag $\tau_j$ (j=1, ..., n, i≠j) from the other of the plurality of secret authentication code adding devices;
open the tag $\tau_j$ at a same time as the other of the plurality of secret authentication code adding devices opening the tag $\tau_j$ such that all of the plurality of secret authentication code adding devices obtain shares $[w]_j$ (j=1, ..., n, i≠j), and decrypt shares $[w]_1$, ..., $[w]_n$ to obtain the verification value "w", wherein "n" is an integer of two or more, the secure text $[x]$, $[\alpha]$, $[\beta]$ and $[a_i]$ is the secure text according to n-party secret sharing, and "i" is any of integers ranging from one to "n", inclusive;
determine whether the verification value "w" is equal to zero or not; and
in response to the verification value "w" is zero, generate and store N secure texts and authentication codes ($[a_i]$, $[\gamma(a_i)]$), ..., ($[a_N]$, $[\gamma(a_N)]$), add the authentication codes ($[a_i]$, $[\gamma(a_1)]$, ..., $[\gamma(a_N)]$) to the N secure texts, and transmit the N secure texts having corresponding authentication codes ($[a_i]$, $[\gamma(a_i)]$), ..., ($[a_N]$, $[\gamma(a_N)]$).

2. The secure computation system according to claim 1, wherein the circuitry configured to update the secure text $[w]$ using a product of the secure text $[w]$ and the secure text having the random value.

3. The secure computation system according to claim 1, the circuitry being configured to:
generate a tag $\tau_i$ where a share $[w]_i$ of the secure text $[w]$ has been committed; and
open the tag $\tau_i$.

4. A secret authentication code adding method implemented on a secure computation system that includes a plurality of secret authentication adding devices for generating and verifying a plurality of secure texts of authentication codes of random values while concealing the random values by secure computation, the method comprising:
by circuitry of each of the plurality of secret authentication code adding devices,
generating secure texts ($[x]$, $[\alpha]$, $[\beta]$) of "x", "$\alpha$" and "$\beta$" that are values satisfying $x\alpha=\beta$ by circuitry of a secret authentication code adding device;
generating secure texts $[a_i]$ of random values "$a_i$" for i=1, ..., N, where N is an integer of one or more by the circuitry of the secret authentication code adding device;
generating authentication codes $[\gamma(a_i)]$ by multiplying the secure texts $[a_i]$ by the secure text $[\alpha]$ for i=1, ..., N by the circuitry of the secret authentication code adding device;
generating the secure text $[w]$ of a verification value "w" by calculating a following formula by the circuitry of the secret authentication code adding device;

$\mathrm{Mul}((\Sigma_i[a_i])+[x],[\alpha])-((\Sigma_i[\gamma(a_i)])+[\beta])$;

generating a tag $\tau_i$ to commit a share $[w]_i$ of the secure text $[w]$ stored in the respective secret authentication code adding device, and transfer the tag $\tau_i$ to each of the other of the plurality of secret authentication code adding devices, while receiving a tag $\tau_j$ (j=1, . . . , n, i≠j) from the other of the plurality of secret authentication code adding devices;

opening the tag $\tau_i$ at a same time as the other of the plurality of secret authentication code adding devices opening the tag $\tau_j$ such that all of the plurality of secret authentication code adding devices perform obtaining shares $[w]_j$ (j=1, . . . n, i≠j), and decrypting shares $[w]_1$, . . . , $[w]_n$ to obtain the verification value "w", wherein "n" is an integer of two or more, the secure text[x], [α], [β] and $[a_i]$ is the secure text according to n-party secret sharing, and "i" is any of integers ranging from one to "n", inclusive;

determining whether the verification value "w" is equal to zero or not; and in response to the verification value "w" is zero, generating and storing N secure texts and authentication codes $([a_1], [\gamma(a_1)])$, . . . , $([a_N], [\gamma(a_N)])$, adding the authentication codes $([a_1], [\gamma(a_1)])$, . . . , $([a_N], [\gamma(a_N)])$ to the N secure texts, and transmitting the N secure texts having corresponding authentication codes $([a_i], [\gamma(a_1)])$, . . . , $([a_N], [\gamma(a_N)])$.

5. A non-transitory computer readable medium including computer executable instructions that make a secret authentication code adding device in a secure computation system that includes a plurality of secret authentication adding devices for generating and verifying a plurality of secure texts of authentication codes of random values while concealing the random values by secure computation perform a method comprising:

generating secure texts ([x], [α], [β]) of "x", "α" and "β" that are values satisfying xα=β;

generating secure texts $[a_i]$ of random values "$a_i$" for i=1, . . . , N, where N is an integer of one or more;

generating authentication codes $[\gamma(a_i)]$ by multiplying the secure texts $[a_i]$ by the secure text [α] for i=1, . . . , N;

generating the secure text [w] of a verification value "w" by calculating a following formula by the circuitry of the secret authentication code adding device;

$$\mathrm{Mul}((\Sigma_i[a_i])+[x],[\alpha])-((\Sigma_i[\gamma(a_i)])+[\beta]);$$

generating a tag $\tau_i$ to commit a share $[w]_i$ of the secure text [w] stored in the respective secret authentication code adding device, and transfer the tag $\tau_i$ to each of the other of the plurality of secret authentication code adding devices, while receiving a tag $\tau_j$ (j=1, . . . , n, i≠j) from the other of the plurality of secret authentication code adding devices;

opening the tag $\tau_i$ at a same time as the other of the plurality of secret authentication code adding devices opening the tag $\tau_j$ such that all of the plurality of secret authentication code adding devices perform obtaining shares $[w]_j$ (j=1, . . . , n, i≠j), and decrypting shares $[w]_1$, . . . , $[w]_n$ to obtain the verification value "w", wherein "n" is an integer of two or more, the secure text[x], [α], [β] and $[a_i]$ is the secure text according to n-party secret sharing, and "i" is any of integers ranging from one to "n", inclusive;

determining whether the verification value "w" is equal to zero or not; and in response to the verification value "w" is zero, generating and storing N secure texts and authentication codes $([a_1], [\gamma(a_1)])$, . . . , $([a_N], [\gamma(a_N)])$, adding the authentication codes $([a_1], [\gamma(a_1)])$, . . . , $([a_N], [\gamma(a_N)])$ to the N secure texts, and transmitting the N secure texts having corresponding authentication codes $([a_1], [\gamma(a_1)])$, . . . , $([a_N], [\gamma(a_N)])$.

* * * * *